United States Patent
Zhang et al.

(10) Patent No.: US 11,954,013 B2
(45) Date of Patent: Apr. 9, 2024

(54) METHOD OF TESTING APPLET PERFORMANCE, ELECTRONIC DEVICE, AND COMPUTER-READABLE MEDIUM

(71) Applicant: BAIDU ONLINE NETWORK TECHNOLOGY (BEIJING) CO., LTD., Beijing (CN)

(72) Inventors: Hongtao Zhang, Beijing (CN); Duo Ma, Beijing (CN); Liping Xiong, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 128 days.

(21) Appl. No.: 17/619,501

(22) PCT Filed: Jun. 2, 2021

(86) PCT No.: PCT/CN2021/097965
§ 371 (c)(1),
(2) Date: Dec. 15, 2021

(87) PCT Pub. No.: WO2022/100075
PCT Pub. Date: May 19, 2022

(65) Prior Publication Data
US 2023/0153229 A1    May 18, 2023

(30) Foreign Application Priority Data
Nov. 16, 2020    (CN) .......................... 202011281567.2

(51) Int. Cl.
*G06F 9/44*    (2018.01)
*G06F 11/36*    (2006.01)

(52) U.S. Cl.
CPC ...... *G06F 11/3664* (2013.01); *G06F 11/3612* (2013.01)

(58) Field of Classification Search
CPC .......................... G06F 11/3664; G06F 11/3612
See application file for complete search history.

(56) References Cited

U.S. PATENT DOCUMENTS

| | | | |
|---|---|---|---|
| 9,003,423 | B1 * | 4/2015 | Rodriguez Valadez ..................... G06F 9/542 719/310 |
| 10,540,270 | B1 | 1/2020 | Surkatty et al. |

(Continued)

FOREIGN PATENT DOCUMENTS

| CN | 109783345 | 5/2019 |
|---|---|---|
| CN | 110188022 | 8/2019 |

(Continued)

OTHER PUBLICATIONS

International Search Report and Written Opinion issued in corresponding PCT Patent Application No. PCT/CN2021/097965 dated Sep. 1, 2021.

(Continued)

*Primary Examiner* — Hang Pan
(74) *Attorney, Agent, or Firm* — Pillsbury Winthrop Shaw Pittman, LLP

(57) ABSTRACT

A method of testing a performance, an electronic device and a computer-readable medium, all of which relate to a field of a computer technology, such as cloud computing and cloud platform technology. The method includes: determining a performance test type of an applet performance to be tested and a participant data interface participating in an applet performance test; transmitting, through the participant data interface, a test indication information corresponding to the performance test type to a terminal device requiring the applet performance test; receiving, from the terminal device, applet running data obtained by performing a data acquisition according to the test indication information; and per- (Continued)

forming an applet performance analysis according to the applet running data, so as to obtain corresponding applet performance data.

19 Claims, 4 Drawing Sheets

(56) References Cited

U.S. PATENT DOCUMENTS

| | | | | |
|---|---|---|---|---|
| 2004/0103394 | A1* | 5/2004 | Manda | G06F 11/3688 |
| | | | | 717/126 |
| 2005/0229043 | A1* | 10/2005 | Nasuti | G06F 11/3688 |
| | | | | 714/38.1 |
| 2007/0208576 | A1* | 9/2007 | Lee | G06F 16/88 |
| | | | | 709/230 |
| 2008/0294383 | A1* | 11/2008 | Parmar | H04L 43/0888 |
| | | | | 702/186 |
| 2015/0310194 | A1* | 10/2015 | Zhang | G06F 21/31 |
| | | | | 726/9 |
| 2018/0018249 | A1* | 1/2018 | Zhao | G06F 11/2294 |

FOREIGN PATENT DOCUMENTS

| | | |
|---|---|---|
| CN | 111045911 | 4/2020 |
| CN | 111858360 | 10/2020 |
| CN | 112346947 | 2/2021 |
| JP | 2006011902 | 1/2006 |
| JP | 2011-221861 | 11/2011 |
| JP | 2017-504121 | 2/2017 |

OTHER PUBLICATIONS

Office Action dated Mar. 2, 2023 in corresponding Japanese Patent Application No. 2021-574990.
Office Action issued in corresponding Chinese Patent Application No. 202011281567.2, dated Apr. 10, 2023.

* cited by examiner

METHOD OF TESTING APPLET PERFORMANCE, ELECTRONIC DEVICE, AND COMPUTER-READABLE MEDIUM

This application is the national phase of PCT Patent Application No. PCT/CN2021/097965, filed Jun. 2, 2021, which claims priority to Chinese Patent Application No. 202011281567.2, filed on Nov. 16, 2020.

TECHNICAL FIELD

The present disclosure relates to a field of a computer technology, in particular to a field of a cloud computing and cloud platform technology, and specifically to a method of testing a performance, an electronic device, and a computer-readable medium.

BACKGROUND

With an explosive growth of applets, various applications and products around applets are continuously concerned and used. An applet is an application that may be run on a third-party application (APP) client. The applet may be easily acquired and disseminated, and may provide a better user experience for a mobile terminal user.

In a development, debugging and release of the applet, a developer needs to perform a performance analysis on the applet, so as to quickly locate a problem in an applet development and improve an applet performance.

SUMMARY

The present disclosure provides a method of testing a performance, an electronic device, and a computer-readable medium.

According to an, the present disclosure provides a method of testing a performance, including: determining a performance test type of an applet performance to be tested and a participant data interface participating in the applet performance test; transmitting, through the participant data interface, a test indication information corresponding to the performance test type to a terminal device requiring the applet performance test; receiving, from the terminal device, applet running data obtained by performing a data acquisition according to the test indication information; and performing an applet performance analysis according to the applet running data, so as to obtain corresponding applet performance data.

According to another aspect, the present disclosure provides a method of testing a performance, including: transmitting an authority acquisition request received from a terminal device to a specified developer platform server, wherein the authority acquisition request is configured to request the developer platform server to verify a user validity of a specified login user; receiving a first test indication information from the developer platform server, wherein the first test indication information is transmitted by the developer platform server in response to verifying that the login user is a valid user; and displaying a scanning identification code for the first test indication information, so that the terminal device acquires the first test indication information by scanning the scanning identification code; wherein the first test indication information is configured to start an applet running data acquisition in the terminal device and indicate a data upload address for the acquired first applet running data, and the first applet running data is used for an applet performance analysis in the developer platform server to obtain corresponding applet performance data.

According to yet another aspect, the present disclosure provides a method of testing a performance, including: generating a second test indication information according to a performance test task received from a developer platform server, wherein the second test indication information indicates a data upload address for second applet running data, and the second applet running data is obtained by performing a running data acquisition according to the performance test task; transmitting the performance test task and the second test indication information to a terminal device in a predetermined terminal device cluster through a task scheduling; receiving the second applet running data from the terminal device in the terminal device cluster; and transmitting the second applet running data to the developer platform server, wherein the second applet running data is used for an applet performance analysis in the developer platform server to obtain corresponding applet performance data.

According to yet another aspect, the present disclosure provides an electronic device, including: one or more processors; a memory having one or more programs stored thereon, wherein the one or more programs, when executed by the one or more processors, cause the one or more processors to implement the method of testing the performance in any of the aspects described above; and one or more I/O interfaces connected between the processor and the memory and configured to achieve an information interaction between the processor and the memory.

According to yet another aspect, the present disclosure provides a computer-readable medium having a computer program stored thereon, wherein the program, when executed by a processor, is allowed to implement the method of testing the performance in any of the aspects described above.

It should be understood that content described in this section is not intended to identify key or important features in the embodiments of the present disclosure, nor is it intended to limit the scope of the present disclosure. Other features of the present disclosure will be easily understood through the following description.

BRIEF DESCRIPTION OF THE DRAWINGS

The accompanying drawings are used to understand the solution better and do not constitute a limitation to the present disclosure.

DETAILED DESCRIPTION OF EMBODIMENTS

Exemplary embodiments of the present disclosure are described below with reference to the accompanying drawings, which include various details of the embodiments of the present disclosure to facilitate understanding, and should be considered as merely exemplary. Therefore, those of ordinary skilled in the art should realize that various changes and modifications may be made to the embodiments described herein without departing from the scope and spirit of the present disclosure. Likewise, for clarity and conciseness, descriptions of well-known functions and structures are omitted in the following description.

In a case of no conflict, the embodiments of the present disclosure and the features in the embodiments may be combined with each other.

The term "and/or" as used here includes any and all combinations of one or more related listed items.

The terms used herein are only used to describe specific embodiments and are not intended to limit the present disclosure. As used herein, the singular forms "a" and "the" are also intended to include a plural form unless the context clearly indicates otherwise. It should also be understood that when terms "including" and/or "made of" are used in the specification, it means that the described features, wholes, steps, operations, elements and/or components are present, but do not exclude the presence or addition of one or more other features, wholes, steps, operations, elements, components and/or combinations thereof.

Figure 1:
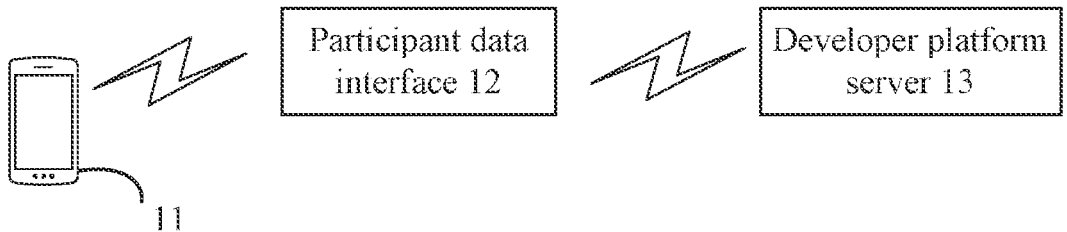
FIG. 1 shows a schematic scenario diagram of testing an applet performance provided by the embodiments of the present disclosure.

FIG. 1 shows a schematic scenario diagram of testing an applet performance provided by the embodiments of the present disclosure. A terminal device 11, a participant data interface 12 and a developer platform server 13 are schematically shown in the scenario shown in FIG. 1.

In some embodiments, the terminal device 11 may include, but is not limited to, a personal computer, a smart phone, a tablet computer, a personal digital assistant, etc. Various applets may be run in the terminal device 11.

The participant data interface 12 is a data interface of a designated participant in a method of testing an applet performance in the embodiments of the present disclosure. The participant data interface 12 may be used to connect the terminal device 11 and the developer platform server 13, and may assist in the applet performance test. For example, the participant data interface 12 may be configured to receive a test indication information from the developer platform server 13, process the test indication information, and transmit a processed relevant information to the terminal device 11.

The developer platform server 13, that is, an applet platform server, may be configured to verify a developer authority, store applet performance data, generate an applet performance report, render the applet performance report, create and schedule a performance test task, and so on.

It should be understood that the number of the terminal device 11 in FIG. 1 is only illustrative and may be adjusted flexibly according to the needs of practical application. For example, in an application scenario where a batch applet test is required, the terminal device 11 may be a terminal device requiring the applet test, or a terminal device cluster including a plurality of terminal devices.

Figure 2:
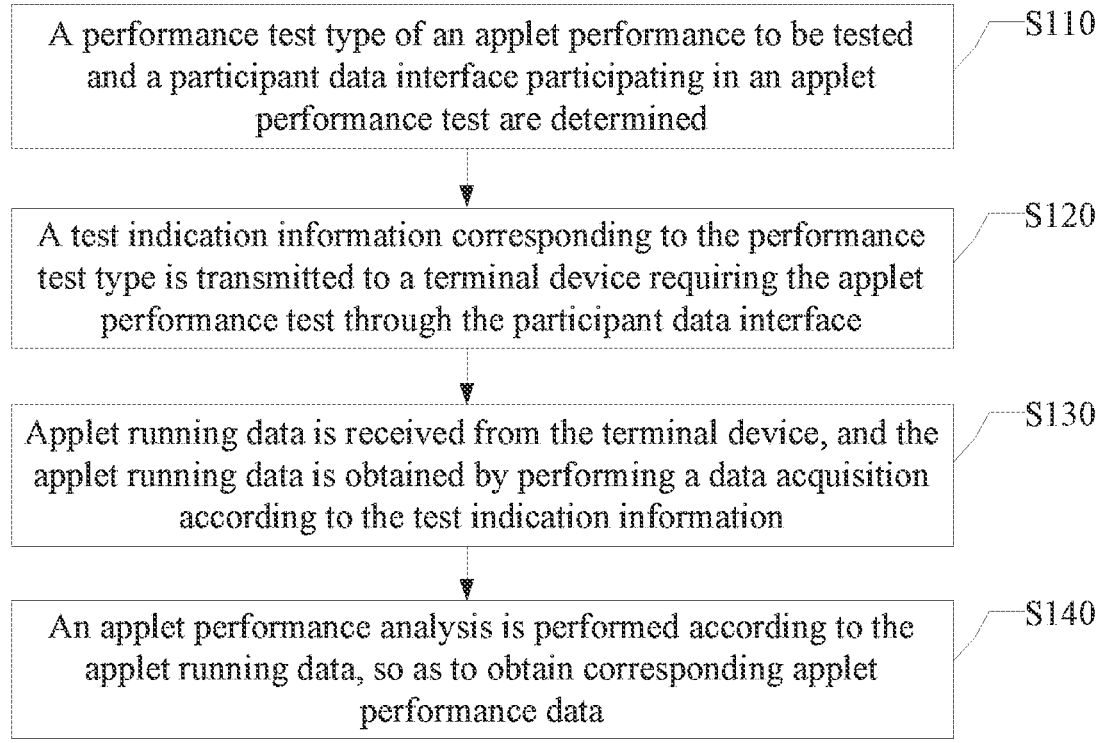
FIG. 2 shows a flowchart of a method of testing an applet performance provided by an embodiment of the present disclosure.

FIG. 2 shows a flowchart of a method of testing an applet performance provided by an embodiment of the present disclosure.

In a first aspect, referring to FIG. 2, the embodiments of the present disclosure provide a method of testing a performance, which may be applied to the developer platform server. The method may include the following steps.

In S110, a performance test type of an applet performance to be tested and a participant data interface participating in an applet performance test are determined.

In S120, a test indication information corresponding to the performance test type is transmitted to a terminal device requiring the applet performance test through the participant data interface.

In S130, applet running data is received from the terminal device, and the applet running data is obtained by performing a data acquisition according to the test indication information.

In S140, an applet performance analysis is performed according to the applet running data, so as to obtain corresponding applet performance data.

According to the method of testing the applet performance of the embodiments of the present disclosure, the developer platform server may determine the corresponding participant data interface according to the performance test type of the applet performance test, and transmit the corresponding test indication information to the terminal device requiring the applet performance test through the determined participant data interface, then perform the applet performance analysis according to the received applet running data acquired by the terminal device according to the test indication information, so as to obtain the applet performance data. In this way, the developer may quickly acquire the performance data during the applet running process and quickly locate the performance problem of the applet, so as to improve the performance and user experience of the applet.

In some embodiments, the step S110 may specifically include the following steps.

In S11, it is determined that the performance test type is a batch applet test and the participant data interface is a data interface of a task scheduling service, in response to determining that a batch processing of the applet performance test is required.

In S12, it is determined that the performance test type is a single applet test and the participant data interface is a data interface of a developer tool, in response to receiving an authority acquisition request transmitted by a terminal device through the data interface of the developer tool.

In the embodiments of the present disclosure, the performance test type of the applet performance test may be a performance test for a single applet actively initiated by the terminal device to the developer platform server, or an applet performance test requiring batch processing actively initiated by the developer platform server.

When the performance test type of the applet is a single applet test, it may be determined that the participant data interface is the data interface of the developer tool, and it is needed to verify the authority of the terminal device requiring the applet performance test according to the received authority acquisition request. When the performance test type of the applet is a batch applet test, it may be determined that the participant data interface is the data interface of the task scheduling service. According to different performance test types, different performance test indication information may be transmitted to the terminal device to acquire the corresponding applet running data, so as to facilitate subsequent corresponding performance test processing.

In some embodiments, in response to determining that the performance test type is the single applet test and the participant data interface is the data interface of the developer tool, S120 may include the following steps.

In S21, a user authority information of the terminal device is acquired in response to the authority acquisition request, and a user validity is verified according to the user authority information of the terminal device. The authority acquisition request includes an identification information of a specified login user, in S22, a first test indication information is transmitted to the data interface of the developer tool in response to verifying that the login user is a valid user, so as to generate and display a scanning identification code for the first test indication information through the developer tool. The scanning identification code is used to transmit the first test indication information to the terminal device through a scanning of the terminal device.

In this embodiment, after the terminal device logs in the developer tool, the authority acquisition request may be transmitted to the developer platform server through the data interface of the developer tool, so as to verify whether the login user is a valid user through the developer platform server. In a case of a valid user, the first test indication information is transmitted to the data interface of the developer tool, so that the test indication information may be transmitted to the terminal device through the data interface of the developer tool.

In some embodiments, the first test indication information may include one or more of a first data upload address, an access token information, a first applet invoking protocol, and a performance test switch state.

In some embodiments, the first test indication information may include the first data upload address. In this embodiment, step S130 may include receiving, through the first data upload address, applet running data of a target applet transmitted by a terminal device. The target applet is an applet opened and run after the terminal device acquires the first test indication information by scanning the scanning identification code.

In this embodiment, in a case of the single applet performance test, the first test indication information may indicate an upload address for the applet running data acquired by the terminal device. The terminal device may upload the acquired applet running data directly to the developer platform server according to the first data upload address.

In some embodiments, the first test indication information may include the access token information generated in response to the validity of the user authority information of the terminal device being successfully verified by the developer platform server. The applet running data is first applet running data carrying a token information. In this embodiment, the step S140 may specifically include step S31 to step S32. In S31, the token information carried in the first applet running data is verified according to the access token information, so as to verify a validity of the first applet running data. In S32, a performance analysis is performed according to the first applet running data in response to verifying that the first applet running data is valid, so as to obtain corresponding applet performance data.

In this embodiment, the access token information may be used to verify the validity of data uploading, so as to ensure a security of the data uploaded from the terminal device to the developer platform server.

In some embodiments, the first test indication information may include the first applet invoking protocol and the performance test switch state. The first applet invoking protocol is used to enable the terminal device to read the first test indication information in a form of the scanning identification code. In response to verifying that the user authority information is valid, the method of testing the performance of the embodiments of the present disclosure may further include setting the performance test switch state to an ON state before the above step of transmitting the first test indication information to the data interface of the developer tool.

In this embodiment, the first applet invoking protocol may be used to acquire the first test indication information in the form of the scanning identification code. For example, when the developer tool displays the first test indication information through a two-dimensional code, the first applet invoking protocol issued by the developer platform may enable the terminal device to read the first test indication information contained in the two-dimensional code by scanning.

In this embodiment, in a case that the developer platform server verifies whether the login user is a valid user, when the first test indication information is transmitted, the performance test switch state may be set to the ON state, so that an acquisition of the applet running data in each stage may be automatically started after the terminal device scans the two-dimensional code and opens the applet to be tested.

In some embodiments, in a case that the performance test type is the single applet test and the participant data interface is the data interface of the developer tool, the method of testing the performance of the embodiments of the present disclosure may further include step S41 and step S42 after obtaining the corresponding applet performance data in step S140. In S41, the applet performance data is determined as first applet performance data, and the first applet performance data is rendered to obtain a first applet performance report. In S42, the first applet performance report is transmitted to the data interface of the developer tool, so as to display the first applet performance report to the terminal device through the developer tool.

In this embodiment, in a case that the developer platform server obtains the applet performance data, the applet performance data may be displayed to the developer through the developer tool, so that a performance analysis and a problem location of the applet may be performed according to the applet performance data.

In some embodiments, when it is determined that the performance test type is the batch applet test and the participant data interface is the data interface of the task scheduling service, step S120 may specifically include the following steps.

In S51, a preset performance test task is transmitted to the data interface of the task scheduling service. The task scheduling service is used to transmit the performance test task and a second test indication information to a terminal device in a terminal device cluster through a task scheduling.

The performance test task includes a task content for at least one specified applet, and the second test indication information is generated by the task scheduling service according to the task content for each specified applet of the at least one specified applet.

In this embodiment, the developer platform server may issue performance test tasks in batch to the data interface of the task scheduling service. After the data interface of the task scheduling service receives the performance test task, the task scheduling service may generate the test indication information corresponding to the performance test task.

In some embodiments, the second test indication information may include a second applet invoking protocol and a second data upload address. The second applet invoking protocol is used to enable the terminal device in the terminal device cluster to acquire the task content for each specified applet;

In this embodiment, step S130 may specifically include receiving the second applet running data through the data interface of the task scheduling service.

The second applet running data is obtained by the terminal device in the terminal device cluster by acquiring running data of each specified applet according to the task content for the specified applet, and transmitted to the second data upload address by the terminal device in the terminal device cluster.

In this embodiment, after receiving the performance test task transmitted through the data interface of the task scheduling service, the terminal device may acquire the task content in the performance test task according to the second applet invoking protocol. Moreover, in this embodiment, after the second applet running data of the specified applet acquired by the terminal device cluster is received through the data interface of the task scheduling service, a predetermined processing may be performed on the second applet running data. For example, a data structured processing may be performed on the second applet running data to obtain structured second applet running data. The obtained structured second applet running data may be transmitted to the developer platform server, and the developer platform server may perform a performance analysis on the received structured second applet running data, so as to obtain the applet performance data.

In some embodiments, the task content for the specific applet may include an applet identification information, an applet resource path and a page query information. The page query information is used to indicate the applet page requiring the performance test.

In this embodiment, the applet identification information is used to identify the specified applet. It should be understood that the task content for the specified applet may include more information to indicate the test content for each stage in the specified applet requiring the performance test.

In some embodiments, when the performance test type is the batch applet test, the method of testing the performance may further include: after the step of obtaining the corresponding applet performance data in step S140, determining the applet performance data as second applet performance data, rendering the second applet performance data to obtain a second applet performance report, and displaying the second applet performance report on the current developer platform server.

In this embodiment, in a case that the performance test type is the batch applet test, the developer platform server may render the applet performance data to obtain the rendered applet performance data, and display the rendered applet performance data to the developer through the developer platform, so as to perform the performance analysis and the problem location of the applet.

In the method of testing the performance of the embodiments of the present disclosure, the developer platform server may determine the participant data interface participating in the performance test according to the performance test type of the applet performance test, and transmit the corresponding test indication information to the terminal device requiring the applet performance test through the determined participant data interface, then perform the applet performance analysis according to the received applet running data acquired by the terminal device according to the test indication information, so as to obtain the applet performance data. The applet performance data may facilitate the developer to quickly locate the performance problem of the applet and optimize the apple, so as to facilitate the developer to improve the performance and the user experience of the applet according to the applet performance data.

Figure 3:
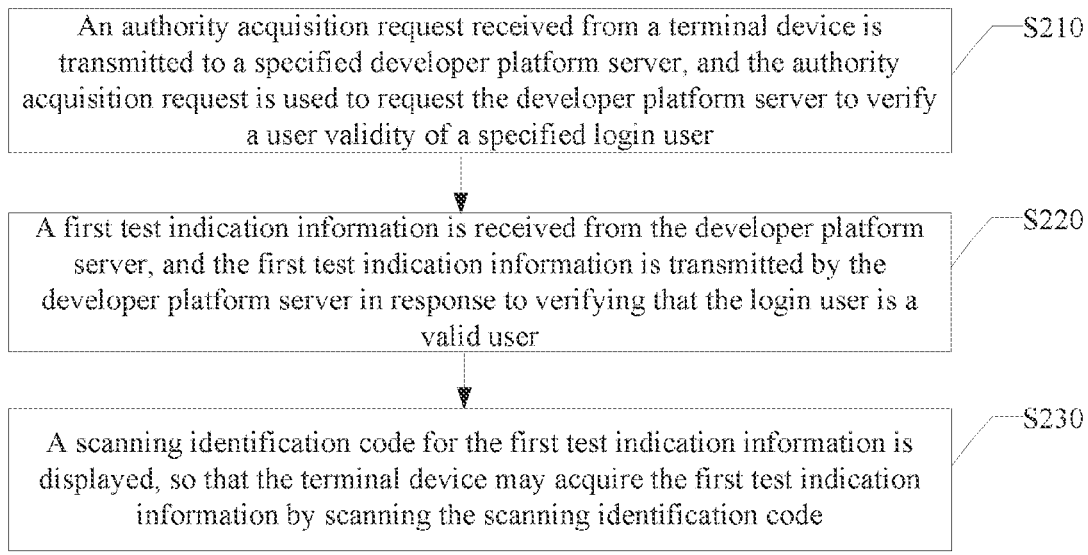
FIG. 3 shows a flowchart of a method of testing a performance provided by another embodiment of the present disclosure.

FIG. 3 shows a flowchart of a method of testing a performance provided by another embodiment of the present disclosure.

In a second aspect, referring to FIG. 3, the embodiments of the present disclosure provide a method of testing a performance, which may be applied to a processor corresponding to the developer tool. The method of testing the performance may include the following steps.

In S210, an authority acquisition request received from a terminal device is transmitted to a specified developer platform server, and the authority acquisition request is used to request the developer platform server to verify a user validity of a specified login user.

In S220, a first test indication information is received from the developer platform server, and the first test indication information is transmitted by the developer platform server in response to verifying that the login user is a valid user.

In S230, a scanning identification code for the first test indication information is displayed, so that the terminal device may acquire the first test indication information by scanning the scanning identification code.

In some embodiments, the first test indication information is used to start an acquisition of applet running data in the terminal device and indicate a data upload address for acquired first applet running data, and the first applet running data is used for the applet performance analysis in the developer platform server, so as to obtain corresponding applet performance data.

In the embodiments of the present disclosure, the developer tool may transmit the authority acquisition request received from the terminal device to the specified developer platform server so that the developer platform server verifies the user validity of the terminal device, receive the first test indication information transmitted by the developer platform server in a case of a valid user, and display the scanning identification code for the first test indication information. Through the method of testing the performance, the terminal device may acquire the first test indication information transmitted by the developer platform by scanning the scanning identification code, start the applet running data acquisition performed according to the first test indication information on the terminal device, and enable the terminal device to transmit the acquired applet running data to the developer platform server according to the indication of the first test indication information. The applet running data is used for the applet performance analysis in the developer platform server so as to obtain the corresponding applet performance data.

In some embodiments, the first test indication information may include one or more of a first applet invoking protocol, a performance test switch state, a first data upload address, and an access token information;

The first applet invoking protocol is used to enable the terminal device to read the first test indication information in the form of the scanning identification code. The performance test switch state is used to, in a case of the ON state, start the acquisition of the first applet running data in the terminal device. The first data upload address indicates a data upload address through which the terminal device transmits the first applet running data to the developer platform server. The access token information is generated by the developer platform server in response to successfully verifying the validity of the user authority information of the terminal device, and the access token information is used to verify a validity of the first applet running data.

In some embodiments, the first applet running data is running data of a target applet, and the target applet is an applet opened and run by the terminal device after the first test indication information is acquired.

The method of testing the performance may further include step S240 and S241 after the step S230. In S240, a first applet performance report from the developer platform server is received, and the first applet performance report is obtained after the developer platform server performs a performance analysis and a rendering processing on the received first applet running data. In S241, the first applet performance report is displayed to the terminal device.

In this embodiment, the performance data of the target applet in the terminal device may be displayed in the developer tool, which may facilitate the developer to quickly acquire the performance data during the applet running process and quickly locate the performance problem of the applet, so as to improve the performance and user experience of the applet.

Figure 4:
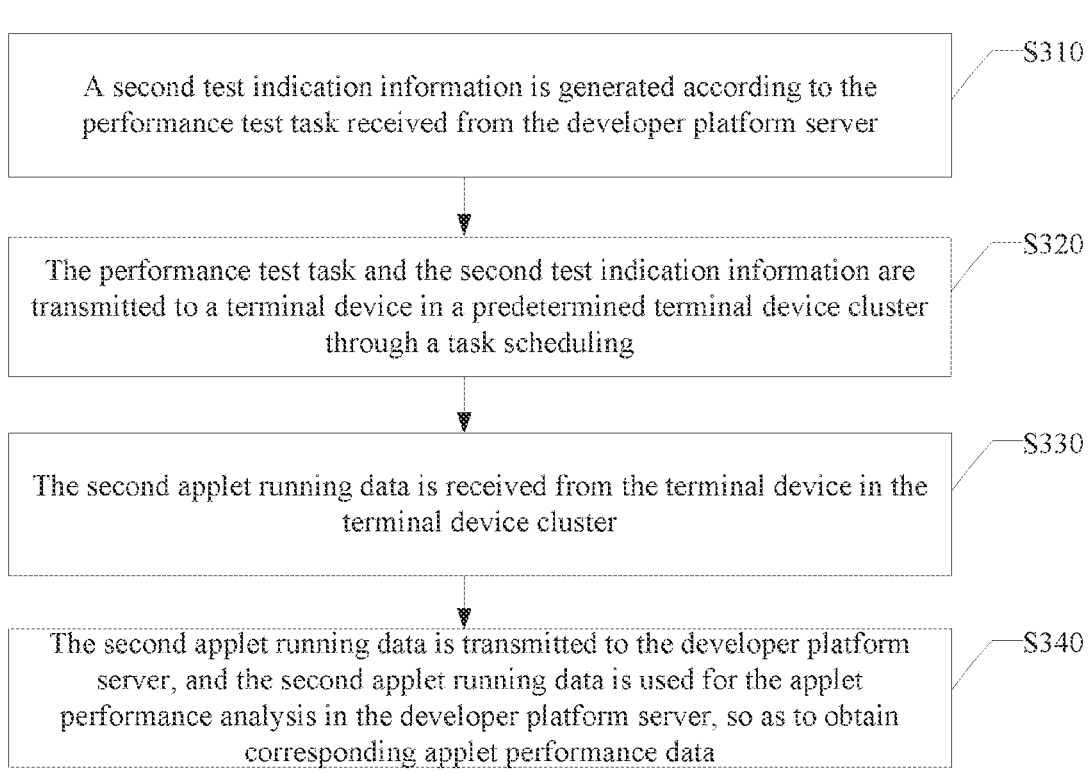
FIG. 4 shows a flowchart of a method of testing a performance provided by yet another embodiment of the present disclosure.

FIG. 4 shows a flowchart of a method of testing a performance provided by yet another embodiment of the present disclosure.

In a third aspect, referring to FIG. 4, the embodiments of the present disclosure provide a method of testing a performance, which may be applied to a processor corresponding to the task scheduling service. The method of testing the performance may include the following steps.

In S310, a second test indication information indicating a data upload address for the second applet running data is generated according to the performance test task received from the developer platform server, and the second applet running data is obtained by performing a running data acquisition according to the performance test task.

In S320, the performance test task and the second test indication information are transmitted to a terminal device in a predetermined terminal device cluster through a task scheduling.

In S330, the second applet running data is received from the terminal device in the terminal device cluster.

In S340, the second applet running data is transmitted to the developer platform server, and the second applet running data is used for the applet performance analysis in the developer platform server, so as to obtain corresponding applet performance data.

According to the method of testing the performance of the embodiments of the present disclosure, the task scheduling service may schedule the performance test task created by the developer platform server and generate the second test indication information corresponding to the performance test task, so as to instruct, through the second test indication information, the terminal device cluster to acquire the task content, perform the applet running data acquisition according to the task content, receive the acquired second applet running data, and transmit the second applet running data to the developer platform server, so that the developer platform server may perform the applet performance analysis according to the second applet running data and obtain the corresponding applet performance data. In this way, the developer may quickly acquire the performance data during the applet running process and quickly locate the performance problem of the applet, so as to improve the performance and user experience of the applet.

In some embodiments, the performance test task may include the task content for at least one specified applet. The second test indication information includes a second applet invoking protocol and a second data upload address, and the second applet invoking protocol is used to enable the terminal device in the terminal device cluster to acquire the task content. The second data upload address is used to indicate a data upload address for the second applet running data.

In this embodiment, after receiving the performance test task transmitted through the data interface of the task scheduling service, the terminal device may acquire the task content in the performance test task according to the second applet invoking protocol. Moreover, in this embodiment, after receiving the second applet running data acquired by the terminal device through the second data upload address, the data interface of the task scheduling service may transmit the second applet running data to the developer platform server, and the developer platform server may perform a performance analysis on the received second applet running data, so as to obtain the applet performance data.

In some embodiments, the task content includes one or more of an applet identification information of each specified applet, an applet resource path for the specified applet, and a page query information for the specified applet. The page query information is used to indicate an applet page to be tested.

In this embodiment, the identification information of each specified applet is used to identify the corresponding specified applet. It should be understood that the task content may include more information to indicate the test content for each stage in the specified applet requiring the performance test.

In the method of testing the performance of the embodiments of the present disclosure, after the data interface of the task scheduling service receives the running data of the specified applet acquired by the terminal device cluster, a predetermined processing may be performed on the running data of the specified applet through the task scheduling service. For example, a data structured processing may be performed to obtain structured applet running data. The obtained structured applet running data may be transmitted to the developer platform server, and the developer platform server may perform a performance analysis on the running data received through the data interface of the task scheduling service, so as to obtain the applet performance data. It is convenient for the developer to improve the performance of the applet and optimize the applet according to the applet performance data, so as to bring better applet use experience to the developer.

Figure 5:
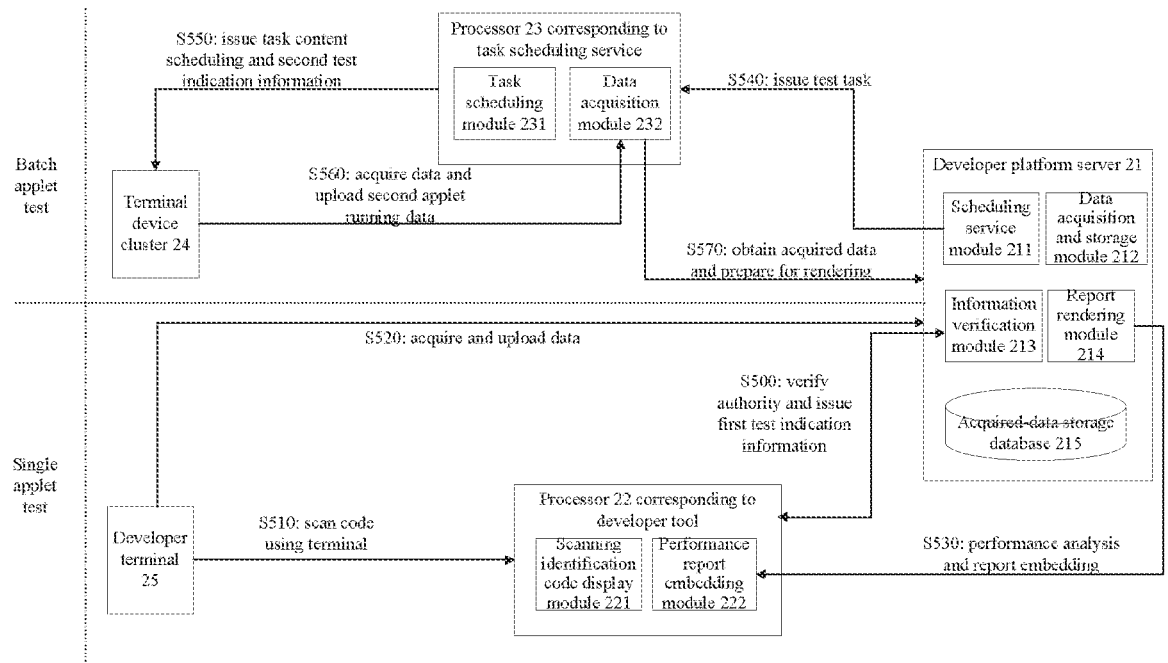
FIG. 5 shows a schematic system architecture diagram provided by the exemplary embodiments of the present disclosure.

FIG. 5 shows a schematic system architecture diagram provided by the exemplary embodiments of the present disclosure. As shown in FIG. 5, the system architecture includes five participants, including a developer platform server 21, a processor 22 corresponding to the developer tool, a processor 23 corresponding to the task scheduling service, a terminal device cluster 24 and a developer terminal 25.

The developer platform server 21 is equivalent to the developer platform server 13 shown in FIG. 1, the processor 22 corresponding to the developer tool is used to provide the developer tool in the embodiments of the present disclosure, the processor 23 corresponding to the task scheduling service is used to provide the task scheduling service in the embodiments of the present disclosure, and the terminal device cluster 24 includes one or more terminal devices.

In some embodiments, the terminal device cluster 24 may include one or more terminal devices in the cloud.

In an embodiment, the developer platform server 21 may include a scheduling service module 211, a data acquisition and storage module 212, an information verification module 213, a report rendering module 214 and an acquired-data storage database 215. The processor 23 corresponding to the task scheduling service may include a task scheduling module 231 and a data acquisition module 232, The processor 22 corresponding to the developer tool may include a scanning identification code display module 221 and a performance report embedding module 222.

As shown in FIG. 5, when it is determined that the performance test type requiring the applet performance test is the single applet test, the performance test may be performed on the applet running on the developer terminal 25 through the developer platform server 21, the processor 22 corresponding to the developer tool and the developer terminal 25. When it is determined that the performance test type of the applet performance test is the batch applet test, the performance test may be performed, through the developer platform server 21, the processor 23 corresponding to the task scheduling service and the terminal device cluster 24, on the applet specified in the performance test task generated by the developer platform server 21.

A single applet performance test process and a batch applet performance test process in the exemplary embodiments of the present disclosure are described below in combination with FIG. 5.

In some embodiments, the single applet performance test process may include the following steps.

In S500, as shown in "verify authority and issue first test indication information" in FIG. 5, the developer platform server 21 verifies the authority of the login user on the developer tool through the information verification module 213, and transmits the first test indication information to the data interface corresponding to the developer tool if the login user has a valid authority, then the developer tool displays the two-dimensional code for the first test indication information through the scanning identification code display module 221.

In this step, the developer terminal 25 transmits the authority acquisition request to the developer platform server 21 through the developer tool. The developer platform server 21 acquires the user authority information of the login user on the developer tool in response to the authority acquisition request, and verifies whether the login user is a valid user according to the user authority information.

In this step, the two-dimensional code for the first test indication information includes the first applet invoking protocol, a token issued by the developer platform server 21 according to the user authority information, the performance test switch and the first data upload address.

In S510, as shown in "scan code using terminal" in FIG. 5, the two-dimensional code displayed in the developer tool is scanned using a specified application in the developer terminal 25, so as to acquire the first test indication information.

In S520, as shown in "acquire and upload data" in FIG. 5, after acquiring the first test indication information, the developer terminal 25 opens the applet, starts to acquire the applet running data in real time so as to obtain the first applet running data if the performance test switch is in the ON state, and transmits the first applet running data to the developer platform server 21 through the first data upload address.

In this step, after obtaining the first applet running data, the developer terminal 25 may sort and process to obtain the structured first applet running data, and upload the structured first applet running data to the developer platform server 21 through the first data upload address.

In some embodiments, the token information may be carried in the first applet running data, and the developer terminal 25 may upload the first applet running data carrying the token information to the developer platform server 21.

In S530, as shown in "performance analysis and report embedding" in FIG. 5, the developer platform server 21 performs the performance analysis on the first applet running data to obtain the first applet performance data, and transmits the first applet performance data to the developer tool.

In this step, the developer platform server 21 may receive the first applet running data uploaded by the developer terminal 25 through the data, acquisition and storage module 212, and store the first applet running data in the acquired-data storage database 215.

After performing the data processing and performance analysis on the first applet running data, the developer platform server 21 may obtain the first applet performance data, store the first applet performance data in the data acquisition and storage module 212, render the first applet performance data through the report rendering module 214 so as to obtain the first applet performance report, transmit the first applet performance report to the data interface of the developer tool, and embed and display the first applet performance report in the developer tool through the performance report embedding module 222.

In this step, if the token information is carried in the first applet running data, the carried token information may be verified through the information verification module 213, and the validity of the first applet running data may be determined according to a verification result. When the first applet running data is valid, the first applet running data is stored in the acquired-data storage database 215, and subsequent data processing and performance analysis may be performed.

In some embodiments, the batch applet performance test process may include the following steps.

In step S540, as shown in "issue test task" in FIG. 5, the developer platform server 21 generates and transmits a performance test task to the processor 23 of the task scheduling service.

In this step, the performance test task may contain a performance test content including the identification information of the applet, and the specified applet path and query information. The performance test content is used to indicate the resource path for the applet to be tested and the page of the applet to be tested.

In step S550, as shown in "issue task content scheduling and second test indication information" in FIG. 5, after receiving the performance test task, the server 23 corresponding to the task scheduling service processes the data in the performance test task content in the performance test task so as to obtain the second applet invoking protocol and the second data upload address. After the scheduling of the task scheduling service, the server 23 corresponding to the task scheduling service transmits the performance test task content in the performance test task and the second test indication information to the terminal device specified by the terminal device cluster 24. The second test indication information is used to indicate the second applet invoking protocol and the second data upload address.

In step S560, as shown in "acquire data and upload second applet running data" in FIG. 5, after running the task issued by the task scheduling service, the terminal device cluster 24 transmits the real-time acquired applet running data to a service terminal specified by the second applet upload address.

In step S570, as shown in "obtain acquired data and prepare for rendering" in FIG. 5, after receiving the second applet running data acquired by the terminal device cluster 24, the task scheduling service may process the second applet running data into structured data, and then transmit the structured data to the data interface of the developer platform server 21, so as to transmit the second applet running data to the developer platform server 21.

In this step, the developer platform server 21 may store the second applet running data to the acquired-data storage database 215 through the data acquisition and storage module 212, render the second applet running data through the report rendering module 214 so as to obtain the second applet performance report, and display the second applet performance report so that the developer may perform the performance analysis and problem location on the applet according to the second applet performance report.

Through the steps S500 to S570 described above, the method of testing the performance of the embodiments of the present disclosure may achieve the performance test of the applet running on the developer's terminal device and achieve the batch test of applets specified by the developer platform server. In this way, the developer may more quickly and intuitively observe the applet running data in each stage, and more quickly optimize the applet, so as to bring the user a better applet use experience.

In the technical solution of the present disclosure, the collection, storage, use, processing, transmission, provision, and disclosure of the user's personal information involved are in compliance with relevant laws and regulations, and do not violate public order and good customs.

Figure 6:
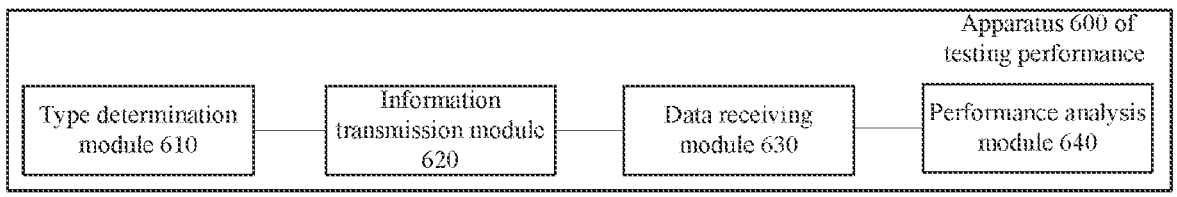
FIG. 6 shows a block diagram of an apparatus of testing a performance provided by an embodiment of the present disclosure.

FIG. 6 shows a block diagram of an apparatus of testing a performance provided by an embodiment of the present disclosure.

In a fourth aspect, referring to FIG. 6, the embodiments of the present disclosure provide an apparatus 600 of testing a performance, which may include: a type determination module 610 configured to determine a performance test type of an applet performance to be tested and a participant data interface participating in an applet performance test; an information transmission module 620 configured to transmit, through the participant data interface, a test indication information corresponding to the performance test type to a terminal device requiring the applet performance test; a data receiving module 630 configured to receive, from the terminal device, applet running data obtained by performing a data acquisition according to the test indication information; and a performance analysis module 640 configured to perform an applet performance analysis according to the applet running data, so as to obtain corresponding applet performance data.

In an embodiment, the type determination module 610 may be further used to: determine that the performance test type is a single applet test and the participant data interface is a data interface of a developer tool, in response to receiving an authority acquisition request transmitted by a terminal device through the data interface of the developer tool; and determine that the performance test type is a batch applet test and the participant data interface is a data interface of a task scheduling service, in response to determining that a batch processing of the applet performance test is required.

In an embodiment, when it is determined that the performance test type is the single applet test and the participant data interface is the data interface of the developer tool, the information transmission module 620 may be further used to: acquire a user authority information of a terminal device in response to the authority acquisition request and verify a user validity according to the user authority information of the terminal device, the authority acquisition request includes an identification information of a specified login user; transmit a first test indication information to the data interface of the developer tool in response to verifying that the login user is a valid user, so as to generate and display a scanning identification code for the first test indication information through the developer tool. The scanning identification code is used to transmit the first test indication information to the terminal device through a scanning of the terminal device.

In an embodiment, the first test indication information may include the first data upload address. The data receiving module 630 is specifically used to receive, through the first data upload address, the applet running data of a target applet transmitted by the terminal device, and the target applet is an applet opened and run after the terminal device acquires the first test indication information by scanning the scanning identification code.

In an embodiment, the first test indication information includes an access token information generated in response to the validity of the user authority information of the terminal device is successfully verified by the developer platform server. The applet running data is first applet running data carrying a token information. The performance analysis module 640 is specifically used to: verify the token information carried in the first applet running data according to the access token information, so as to verify a validity of the first applet running data; and perform a performance analysis according to the first applet running data in response to verifying that the first applet running data is valid, so as to obtain the corresponding applet performance data.

In an embodiment, the first test indication information may include a first applet invoking protocol and a performance test switch state. The first applet invoking protocol is used to enable the terminal device to read the first test indication information in the form of the scanning identification code. The apparatus 600 of testing the performance may further include a test switch state setting module configured to: in response to verifying that the user authority information is valid, setting the performance test switch state to the ON state before transmitting the first test indication information to the data interface of the developer tool.

In an embodiment, the apparatus 600 of testing the performance may further include: a report display module configured to: in a case that the performance test type is the single applet test and the participant data interface is the data interface of the developer tool, after obtaining the corresponding applet performance data, determine the applet performance data as first applet performance data and render the first applet performance data so as to obtain a first applet performance report; transmit the first applet performance report to the data interface of the developer tool, so as to display the first applet performance report to the terminal device through the developer tool.

In an embodiment, in a case that the performance test type is the batch applet test and the participant data interface is the data interface of the task scheduling service, the information transmission module 620 is further used to transmit a preset performance test task to the data interface of the task scheduling service. The task scheduling service is used to transmit the performance test task and a second test indication information to a terminal device in a terminal device cluster through a task scheduling. The performance test task includes a task content for at least one specified applet, and the second test indication information is generated by the task scheduling service according to the task content for each specified applet of the at least one specified applet.

In an embodiment, the second test indication information may include a second applet invoking protocol and a second data upload address. The second applet invoking protocol is used to enable the terminal device in the terminal device cluster to acquire the task content for each specified applet. The data receiving module 630 is further used to receive second applet running data through the data interface of the task scheduling service. The second applet running data is obtained by the terminal device in the terminal device cluster by acquiring running data of each specified applet according to the task content for the specified applet, and transmitted to the second data upload address by the terminal device in the terminal device cluster.

In an embodiment, the task content includes one or more of an applet identification information of each specified applet, an applet resource path for the specified applet, and a page query information for the specified applet. The page query information is used to indicate an applet page to be tested.

In an embodiment, the report display module may be further used to: in a case that the performance test type is the batch applet test, after obtaining the corresponding applet performance data, determine the applet performance data as second applet performance data, render the second applet performance data to obtain a second applet performance report, and display the second applet performance report on the current developer platform server.

According to the apparatus of testing the performance of the embodiments of the present disclosure, the developer platform server may determine the corresponding participant data interface according to the performance test type of the applet performance test, transmit the corresponding test indication information to the terminal device requiring, the applet performance test through the determined participant data interface, and perform an applet performance analysis according to the received applet running data acquired by the terminal device according to the test indication information, so as to obtain the applet performance data. In this way, the developer may quickly acquire the performance data during the applet running process and quickly locate the performance problem of the applet, so as to improve the performance and user experience of the applet.

Figure 7:
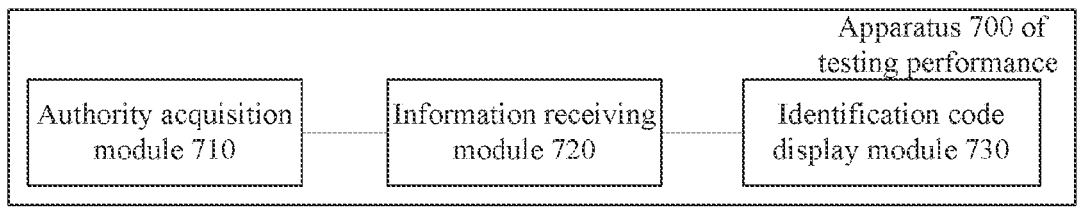
FIG. 7 shows a block diagram of an apparatus of testing a performance provided by another embodiment of the present disclosure.

FIG. 7 shows a block diagram of an apparatus of testing a performance provided by another embodiment of the present disclosure.

In a fifth aspect, referring to FIG. 7, the embodiments of the present disclosure provide an apparatus 700 of testing a performance, which may include: an authority acquisition module 710 configured to transmit an authority acquisition request received from a terminal device to a specified developer platform server, the authority acquisition request is used to request the developer platform server to verify a user validity of a specified login user; an information receiving module 720 configured to receive a first test indication information from the developer platform server, the first test indication information is an information transmitted by the developer platform server in response to verifying that the login user is a valid user; and an identification code display module 730 configured to display a scanning identification code for the first test indication information, so that the terminal device acquires the first test indication information by scanning the scanning identification code.

The first test indication information is used to start an acquisition of applet running data in the terminal device and indicate a data upload address for the acquired first applet running data. The first applet running data is used for an applet performance analysis in the developer platform server, so as to obtain corresponding applet performance data.

In an embodiment, the first applet running data is running data of a target applet, and the target applet is an applet opened and run by the terminal device after the first test indication information is acquired. The apparatus 700 of testing the performance may further include: a performance report receiving module configured to receive a first applet performance report from the developer platform server after the scanning identification code for the first test indication information is displayed, the first applet performance report is obtained after the developer platform server performs a performance analysis and a rendering processing on the received first applet running data; and a performance report display module configured to display the first applet performance report to the terminal device.

In an embodiment, the first test indication information may include one or more of a first applet invoking protocol, a performance test switch state, a first data upload address, and an access token information. The first applet invoking protocol is used to enable the terminal device to read the first test indication information in the form of the scanning identification code. The performance test switch state is used to, in a case of an ON state, start the acquisition of the first applet running data in the terminal device. The first data upload address is used to indicate a data upload address through which the terminal device transmits the first applet running data to the developer platform server. The access token information is generated by the developer platform server in response to successfully verifying a validity of the user authority information of the terminal device, and the access token information is used to verify the validity of the first applet running data.

According to the apparatus of testing the performance of the embodiments of the present disclosure, the processor corresponding to the developer tool may transmit the authority acquisition request received from the terminal device to the specified developer platform server so that the developer platform server verifies the user validity of the terminal device, receive the first test indication information transmitted by the developer platform server in a case of a valid user, and display the scanning identification code for the first test indication information, so that the terminal device may acquire the first test indication information transmitted by the developer platform by scanning the scanning identification code, start the applet running data acquisition performed according to the first test indication information on the terminal device, and transmit the acquired applet running data to the developer platform server according to the indication of the first test indication information. The applet running data is used for the applet performance analysis in the developer platform server so as to obtain the corresponding applet performance data.

Figure 8:
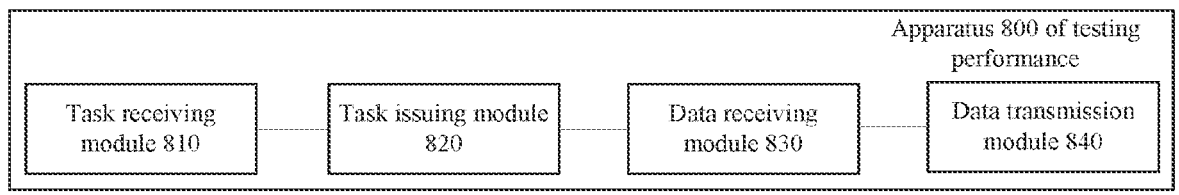
FIG. 8 shows a block diagram of an apparatus of testing a performance provided by yet another embodiment of the present disclosure.

FIG. 8 shows a block diagram of an apparatus of testing a performance provided by yet another embodiment of the present disclosure.

In a sixth aspect, referring to FIG. 8, the embodiments of the present disclosure provide an apparatus 800 of testing a performance, Which may include: a task receiving module 810 configured to generate a second test indication information according to a performance test task received from the developer platform server, the second test indication information is used to indicate a data upload address for the second applet running data, and the second applet running data is obtained by performing a running data acquisition according to the performance test task; a task issuing module 820 configured to transmit the performance test task and the second test indication information to a terminal device in a predetermined terminal device cluster through a task scheduling; a data receiving module 830 configured to receive the second applet running data from the terminal device in the terminal device cluster; and a data transmission module 840 configured to transmit the second applet running data to the developer platform server, and the second applet running data is used for an applet performance analysis in the developer platform server, so as to obtain corresponding applet performance data.

In an embodiment, the performance test task includes a task content for at least one specified applet. The task content includes one or more of an applet identification information of each specified applet, an applet resource path for the specified applet, and a page query information for the specified applet, and the page query information is used to indicate an applet page to be tested. The second test indication information includes a second applet invoking protocol and a second data upload address. The second applet invoking protocol is used to enable the terminal device in the terminal device cluster to acquire the task content. The second data upload address is used to indicate a data upload address for the second applet running data.

According to the apparatus of testing the performance of the embodiments of the present disclosure, the server corresponding to the scheduling service may schedule the performance test task created by the developer platform server and generate the second test indication information corresponding to the performance test task, so as to instruct, through the second test indication information, the terminal device cluster to: acquire the task content, acquire the applet running data according to the task content, receive the acquired second applet running data, and transmit the second applet running data to the developer platform server, so that the developer platform server may perform the applet performance analysis according to the second applet running data to obtain the corresponding applet performance data. In this way, the developer may quickly acquire the performance data during the applet running process and quickly locate the performance problem of the applet, so as to improve the performance and user experience of the applet.

It should be noted that the present disclosure is not limited to the specific configuration and processing described in the above embodiments and shown in the figures. For the convenience and conciseness of the description, detailed descriptions of known methods are omitted here, and the specific operating processes of the systems, modules, and units described above may refer to the corresponding processes in the foregoing method embodiments, which will not be repeated here.

According to the embodiments of the present disclosure, the present disclosure further provides an electronic device and a readable storage medium.

Figure 9:
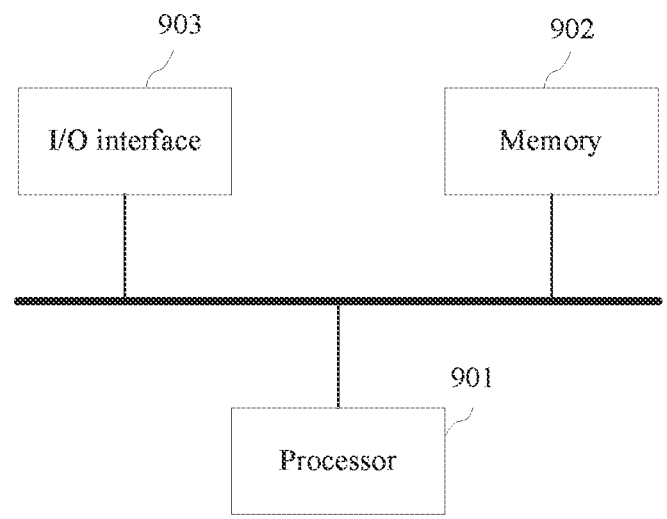
FIG. 9 shows a block diagram of an electronic device provided by the embodiments of the present disclosure.

FIG. 9 shows a block diagram of an electronic device for implementing the method of testing the performance according to the embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 9, the electronic device may include one or more processors 901, a memory 902, and interface(s) for connecting various components, including high-speed interface(s) and low-speed interface(s). The various components are connected to each other by using different buses, and may be installed on a common motherboard or installed in other manners as required. The processor may process instructions executed in the electronic device, including instructions stored in or on the memory to display graphical information of GUI (Graphical User Interface) on an external input/output device (such as a display device coupled to an interface). In other embodiments, a plurality of processors and/or a plurality of buses may be used with a plurality of memories, if necessary. Similarly, a plurality of electronic devices may be connected in such a manner that each device provides a part of necessary operations (for example, as a server array, a group of blade servers, or a multi-processor system). In FIG. 9, a processor 901 is illustrated by way of example.

The memory 902 is a non-transitory computer-readable storage medium provided by the present disclosure. The memory stores instructions executable by at least one processor, to cause the at least one processor to perform the method of testing the performance provided in the present disclosure. The non-transitory computer-readable storage medium of the present disclosure stores computer instructions for allowing a computer to perform the method of testing the performance provided in the present disclosure.

The memory 902, as a non-transitory computer-readable storage medium, may be used to store non-transitory software programs, non-transitory computer-executable programs and modules, such as program instructions/modules corresponding to the method of testing the performance in the embodiments of the present disclosure. The processor 901 executes various functional applications and data processing of the server by executing the non-transient software programs, instructions and modules stored in the memory 902, thereby implementing the method of testing the performance in the embodiments of the method mentioned above.

The memory 902 may include a program storage area and a data storage area. The program storage area may store an operating system and an application program required by at least one function. The data storage area may store data etc. generated by using the electronic device for implementing the method of testing the performance. In addition, the memory 902 may include a high-speed random access memory, and may further include a non-transitory memory, such as at least one magnetic disk storage device, a flash memory device, or other non-transitory solid-state storage devices. In some embodiments, the memory 902 may optionally include a memory provided remotely with respect to the processor 901, and such remote memory may be connected through a network to the electronic device for implementing the method of testing the performance. Examples of the above-mentioned network include, but are not limited to the Internet, intranet, local area network, mobile communication network, and combination thereof.

The electronic device for implementing the method of testing the performance may further include an input device 903 and an output device 904. The processor 901, the memory 902, the input device 903 and the output device 904 may be connected by a bus or in other manners. In FIG. 9, the connection by a bus is illustrated by way of example.

The input device 903 may receive input information of numbers or character, and generate key input signals related to user settings and function control of the electronic device for implementing the method of testing the performance, such as a touch screen, a keypad, a mouse, a track pad, a touchpad, a pointing stick, one or more mouse buttons, a trackball, a joystick, and so on. The output device 904 may include a display device, an auxiliary lighting device (for example, LED), a tactile feedback device (for example, a vibration motor), and the like. The display device may include, but is not limited to, a liquid crystal display (LCD), a light emitting diode (LED) display, and a plasma display. In some embodiments, the display device may be a touch screen.

According to the embodiments of the present disclosure, the present disclosure further provides a computer program product containing a computer program, and the computer program when executed by a processor may implement any of the method of testing the performance described above.

Various embodiments of the systems and technologies described herein may be implemented in a digital electronic circuit system, an integrated circuit system, an application specific integrated circuit (ASIC), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from the storage system, the at least one input device and the at least one output device, and may transmit the data and instructions to the storage system, the at least one input device, and the at least one output device.

These computing programs (also referred as programs, software, software applications, or codes) include machine instructions for a programmable processor, and may be implemented using high-level programming languages, object-oriented programming languages, and/or assembly/machine languages. As used herein, the terms "machine-readable medium" and "computer-readable medium" refer to any computer program product, apparatus and/or device (for example, magnetic disk, optical disk, memory, programmable logic device (PLD)) for providing machine instructions and/or data to a programmable processor, including a machine-readable medium for receiving machine instructions as machine-readable signals. The term "machine-readable signal" refers to any signal for providing machine instructions and/or data to a programmable processor.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with users. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include a client and a server. The client and the server are generally far away from each other and usually interact through a communication network. The server may be a cloud server. The server may also be a server of a distributed system or a server combined with a blockchain. The relationship between the client and the server is generated through computer programs running on the corresponding computer and having a client-server relationship with each other.

In the embodiments of the present disclosure, artificial intelligence is the study of making the computer to simulate some human thinking processes and intelligent behaviors (such as learning, reasoning, planning, etc.), which includes both hardware-level technologies and software-level technologies. Artificial intelligence hardware technology generally includes sensors, special artificial intelligence chips, cloud computing, distributed storage, big data processing and other technologies. Artificial intelligence software technology includes computer vision technology, speech recognition technology, natural language processing technology and machine learning/deep learning, big data processing technology, knowledge graph technology, and other major directions.

In the technical solution of the present disclosure, the collection, storage, use, processing, transmission, provision, and disclosure of the user's personal information involved are in compliance with relevant laws and regulations, and do not violate public order and good customs.

Embodiments are provided according to the following clauses:
 1. A method of testing a performance, the method comprising:
    determining a performance test type of an applet performance to be tested and a participant data interface participating in an applet performance test;
    transmitting, through the participant data interface, a test indication information corresponding to the performance test type to a terminal device requiring the applet performance test;
    receiving, from the terminal device, applet running data obtained by performing a data acquisition according to the test indication information; and performing an applet performance analysis according to the applet running data, so as to obtain corresponding applet performance data.

2. The method of clause 1, wherein the determining a performance test type of an applet performance to be tested and a participant data interface participating in an applet performance test comprises:
   determining the performance test type as a batch applet test and the participant data interface as a data interface of a task scheduling service, in response to determining that a batch processing of the applet performance test is required; and determining the performance test type as a single applet test and the participant data interface as a data interface of a developer tool, in response to receiving an authority acquisition request transmitted by a terminal device through the data interface of the developer tool.

3. The method of clause 2, wherein in response to determining the performance test type as the single applet test and the participant data interface as the data interface of the developer tool, the transmitting, through the participant data interface, a test indication information corresponding to the performance test type to a terminal device requiring the applet performance test comprises:
   acquiring a user authority information of the terminal device in response to the authority acquisition request, and verifying a user validity according to the user authority information of the terminal device, wherein the authority acquisition request comprises an identification information of a specified login user;
   transmitting a first test indication information to the data interface of the developer tool in response to verifying that the login user is a valid user, so as to generate and display a scanning identification code for the first test indication information through the developer tool, wherein the scanning identification code is configured to transmit the first test indication information to the terminal device through a scanning of the terminal device.

4. The method of clause 3, wherein the first test indication information comprises a first data upload address; and the receiving, from the terminal device, applet running data obtained by performing a data acquisition according to the test indication information comprises:
   receiving, through the first data upload address, applet running data of a target applet transmitted by the terminal device, wherein the target applet is an applet opened and run after the terminal device acquires the first test indication information by scanning the scanning identification code.

5. The method of clause 3, wherein,
   the first test indication information comprises an access token information generated in response to a validity of the user authority information of the terminal device being successfully verified by a developer platform server;
   the applet running data is first applet running data carrying a token information; and
   the performing an applet performance analysis according to the applet running data, so as to obtain corresponding applet performance data comprises:
   verifying the token information carried in the first applet running data according to the access token information, so as to verify a validity of the first applet running data; and
   performing a performance analysis according to the first applet running data in response to verifying that the first applet running data is valid, so as to obtain first applet performance data.

6. The method of clause 3, wherein the first test indication information comprises a first applet invoking protocol and a performance test switch state;
   wherein the first applet invoking protocol is configured to enable the terminal device to read the first test indication information in a form of the scanning identification code; and
   wherein in response to verifying that the user authority information is valid, the method of testing the performance further comprises:
   before transmitting the first test indication information to the data interface of the developer tool,
   setting the performance test switch state to an ON state.

7. The method of any of clauses 1 to 6, wherein in response to determining the performance test type as the single applet test and the participant data interface as the data interface of the developer tool, the method of testing the performance further comprises:
   after obtaining the corresponding applet performance data, determining the applet performance data as first applet performance data, and rendering the first applet performance data, so as to obtain a first applet performance report; and
   transmitting the first applet performance report to the data interface of the developer tool, so as to display the first applet performance report to the terminal device through the developer tool.

8. The method of clause 2, wherein in response to determining the performance test type as the batch applet test and the participant data interface as the data interface of the task scheduling service, the transmitting, through the participant data interface, a test indication information corresponding to the performance test type to a terminal device requiring the applet performance test comprises:
   transmitting a preset performance test task to the data interface of the task scheduling service, wherein the task scheduling service is configured to transmit the performance test task and a second test indication information to a terminal device in a terminal device cluster through a task scheduling, wherein the performance test task comprises a task content for at least one specified applet, and the second test indication information is generated by the task scheduling service according to the task content of each specified applet of the at least one specified applet.

9. The method of clause 8, wherein the second test indication information comprises a second applet invoking protocol and a second data upload address; the second applet invoking protocol is configured to enable the terminal device in the terminal device cluster to acquire the task content of each specified applet; and
   wherein the receiving, from the terminal device, applet running data obtained by performing a data acquisition according to the test indication information comprises:
   receiving second applet running data through the data interface of the task scheduling service, wherein the second applet running data is obtained by the terminal device in the terminal device cluster by performing a running data acquisition on each specified applet according to the task content for the specified applet, and transmitted to the second data upload address by the terminal device in the terminal device cluster.

10. The method of clause 8 or 9, wherein the task content comprises one or more of an applet identification information of each specified applet, an applet resource path for the specified applet, and a page query information for the specified applet, and the page query information indicates an applet page to be tested.

11. The method of any of clauses 1 to 6, wherein in response to determining the performance test type as the batch applet test, the method of testing the performance further comprises: after obtaining the corresponding applet performance data,
   determining the applet performance data as second applet performance data, and rendering the second applet performance data, so as to obtain a second applet performance report; and
   displaying the second applet performance report on a current developer platform server.

12. A method of testing a performance, the method comprising:
   transmitting an authority acquisition request received from a terminal device to a specified developer platform server, wherein the authority acquisition request is configured to request the developer platform server to verify a user validity of a specified login user;
   receiving a first test indication information from the developer platform server, wherein the first test indication information is transmitted by the developer platform server in response to verifying that the login user is a valid user; and
   displaying a scanning identification code for the first test indication information, so that the terminal device acquires the first test indication information by scanning the scanning identification code;
   wherein the first test indication information is configured to start an applet running data acquisition in the terminal device and indicate a data upload address for acquired first applet running data, and the first applet running data is used for an applet performance analysis in the developer platform server to obtain corresponding applet performance data.

13. The method of clause 12, wherein the first applet running data is running data of a target applet, and the target applet is an applet opened and run by the terminal device after the first test indication information is acquired; and
   wherein the method of testing the performance further comprises:
   after displaying the scanning identification code for the first test indication information, receiving a first applet performance report from the developer platform server, wherein the first applet performance report is obtained after the developer platform server performs a performance analysis and a rendering processing on the received first applet running data; and
   displaying the first applet performance report to the terminal device.

14. The method of clause 12 or 13, wherein the first test indication information comprises one or more of a first applet invoking protocol, a performance test switch state, a first data upload address, and an access token information; and wherein,
   the first applet invoking protocol is configured to enable the terminal device to read the first test indication information in a form of the scanning identification code;
   the performance test switch state is configured to, in response to being set to an ON state, start an acquisition of the first applet running data in the terminal device;
   the first data upload address indicates a data upload address through which the terminal device transmits the first applet running data to the developer platform server; and
   the access token information is generated by the developer platform server in response to successfully verifying a validity of the user authority information of the terminal device, and the access token information is configured to verify a validity of the first applet running data.

15. A method of testing a performance, the method comprising:
   generating a second test indication information according to a performance test task received from a developer platform server, wherein the second test indication information indicates a data upload address for second applet running data, and the second applet running data is obtained by performing a running data acquisition according to the performance test task;
   transmitting the performance test task and the second test indication information to a terminal device in a predetermined terminal device cluster through a task scheduling;
   receiving the second applet running data from the terminal device in the terminal device cluster; and
   transmitting the second applet running data to the developer platform server, wherein the second applet running data is used for an applet performance analysis in the developer platform server to obtain corresponding applet performance data.

16. The method of clause 15, wherein,
   the performance test task comprises a task content for at least one specified applet, the task content comprises one or more of an applet identification information of each specified applet, an applet resource path for the specified applet, and a page query information for the specified applet, and the page query information indicates an applet page to be tested; and
   the second test indication information comprises a second applet invoking protocol and a second data upload address; the second applet invoking protocol is configured to enable the terminal device in the terminal device cluster to acquire the task content; and the second data upload address indicates a data upload address for the second applet running data.

17. An apparatus of testing a performance, comprising:
   a type determination module configured to determine a performance test type of an applet performance to be tested and a participant data interface participating in an applet performance test;
   an information transmission module configured to transmit, through the participant data interface, a test indication information corresponding to the performance test type to a terminal device requiring the applet performance test;
   a data receiving module configured to receive, from the terminal device, applet running data obtained by performing a data acquisition according to the test indication information; and a performance analysis module configured to perform an applet performance analysis according to the applet running data, so as to obtain corresponding applet performance data.

18. An apparatus of testing a performance, comprising:
an authority acquisition module configured to transmit an authority acquisition request received from a terminal device to a specified developer platform server, wherein the authority acquisition request is configured to request the developer platform server to verify a user validity of a specified login user;
an information receiving module configured to receive a first test indication information from the developer platform server, wherein the first test indication information is transmitted by the developer platform server in response to verifying that the login user is a valid user; and
an identification code display module configured to display a scanning identification code for the first test indication information, so that the terminal device acquires the first test indication information by scanning the scanning identification code; wherein the first test indication information is configured to start an applet running data acquisition in the terminal device and indicate a data upload address for acquired first applet running data, and the first applet running data is used for an applet performance analysis in the developer platform server to obtain corresponding applet performance data.

19. An apparatus of testing a performance, comprising:
a task receiving module configured to generate a second test indication information according to a performance test task received from a developer platform server, wherein the second test indication information indicates a data upload address for second applet running data, and the second applet running data is obtained by performing a running data acquisition according to the performance test task;
a task issuing module configured to transmit the performance test task and the second test indication information to a terminal device in a predetermined terminal device cluster through a task scheduling;
a data receiving module configured to receive the second applet running data from the terminal device in the terminal device cluster; and
a data transmission module configured to transmit the second applet running data to the developer platform server, wherein the second applet running data is used for an applet performance analysis in the developer platform server to obtain corresponding applet performance data.

20. An electronic device, comprising:
one or more processors;
a memory having one or more programs stored thereon, wherein the one or more programs, when executed by the one or more processors, cause the one or more processors to implement the method of testing the performance of any of clauses 1 to 11, the method of testing the performance of any of clauses 12 to 14, or the method of testing the performance of clause 15 or 16; and one or more I/O interfaces connected between the processor and the memory and configured to achieve an information interaction between the processor and the memory.

21. A computer-readable medium having a computer program stored thereon, wherein the program, when executed by a processor, is allowed to implement the method of testing the performance of any of clauses 1 to 11, the method of testing the performance of any of clauses 12 to 14, or the method of testing the performance of clause 15 or 16.

22. A computer program product containing a computer program, wherein the computer program, when executed by a processor, is allowed to implement the method of testing the performance of any of clauses 1 to 11, the method of testing the performance of any of clauses 12 to 14, or the method of testing the performance of clause 15 or 16.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent substitutions and improvements made within the spirit and principles of the present disclosure shall be contained in the scope of protection of the present disclosure.

What is claimed is:

1. A method of testing a performance, the method comprising:
   determining a performance test type of an applet performance to be tested and a participant data interface participating in an applet performance test;
   transmitting, through the participant data interface, a test indication information corresponding to the performance test type to a terminal device requiring the applet performance test;
   receiving, from the terminal device, applet running data obtained by performing a data acquisition according to the test indication information, wherein in response to determining the performance test type as a single applet test and the participant data interface as a data interface of a developer tool, the applet running data is first applet running data carrying a token information; and
   performing an applet performance analysis according to the applet running data, so as to obtain corresponding applet performance data, comprising:
      verifying the token information carried in the first applet running data according to an access token information, so as to verify a validity of the first applet running data; and
      performing a performance analysis according to the first applet running data in response to verifying that the first applet running data is valid, so as to obtain first applet performance data, wherein the access token information is generated in response to a validity of the user authority information of the terminal device being successfully verified by a developer platform server.

2. The method of testing the performance of claim 1, wherein the determining a performance test type of an applet performance to be tested and a participant data interface participating in an applet performance test comprises:
- determining the performance test type as a batch applet test and the participant data interface as a data interface of a task scheduling service, in response to determining that a batch processing of the applet performance test is required; and
- determining the performance test type as the single applet test and the participant data interface as the data interface of the developer tool, in response to receiving an authority acquisition request transmitted by a terminal device through the data interface of the developer tool.

3. The method of testing the performance of claim 2, wherein the transmitting, through the participant data interface, a test indication information corresponding to the performance test type to a terminal device requiring the applet performance test comprises:
- acquiring a user authority information of the terminal device in response to the authority acquisition request, and verifying a user validity according to the user authority information of the terminal device, wherein the authority acquisition request comprises an identification information of a specified login user;
- transmitting a first test indication information to the data interface of the developer tool in response to verifying that the login user is a valid user, so as to generate and display a scanning identification code for the first test indication information through the developer tool, wherein the scanning identification code is configured to transmit the first test indication information to the terminal device through a scanning of the terminal device.

4. The method of testing the performance of claim 3, wherein the first test indication information comprises a first data upload address; and the receiving, from the terminal device, applet running data obtained by performing a data acquisition according to the test indication information comprises:
- receiving, through the first data upload address, applet running data of a target applet transmitted by the terminal device, wherein the target applet is an applet opened and run after the terminal device acquires the first test indication information by scanning the scanning identification code.

5. The method of testing the performance of claim 3, wherein the first test indication information comprises the access token information.

6. The method of testing the performance of claim 3, wherein the first test indication information comprises a first applet invoking protocol and a performance test switch state;
- wherein the first applet invoking protocol is configured to enable the terminal device to read the first test indication information in a form of the scanning identification code; and
- wherein the method of testing the performance further comprises: in response to verifying that the user authority is valid, setting the performance test switch state to an ON state before transmitting the first test indication information to the data interface of the developer tool.

7. The method of testing the performance of claim 1, further comprising:
- in response to the performance test type being determined as a single applet test, the participant data interface being determined as a data interface of the developer tool, and the corresponding applet performance data being obtained,
- determining the applet performance data as first applet performance data, and rendering the first applet performance data, so as to obtain a first applet performance report; and
- transmitting the first applet performance report to the data interface of the developer tool, so as to display the first applet performance report to the terminal device through the developer tool,
- and in response to the performance test type being determined as a batch applet test, and the corresponding applet performance data being obtained,
- determining the applet performance data as second applet performance data, and rendering the second applet performance data, so as to obtain a second applet performance report; and
- displaying the second applet performance report on a current developer platform server.

8. The method of testing the performance of claim 2, wherein in response to determining the performance test type as the batch applet test and the participant data interface as the data interface of the task scheduling service, the transmitting, through the participant data interface, a test indication information corresponding to the performance test type to a terminal device requiring the applet performance test comprises:
- transmitting a preset performance test task to the data interface of the task scheduling service, wherein the task scheduling service is configured to transmit the performance test task and a second test indication information to a terminal device in a terminal device cluster through a task scheduling, wherein the performance test task comprises a task content for at least one specified applet, and the second test indication information is generated by the task scheduling service according to the task content of each specified applet of the at least one specified applet,
- wherein the second test indication information comprises a second applet invoking protocol and a second data upload address, the second applet invoking protocol configured to enable the terminal device in the terminal device cluster to acquire the task content of each specified applet; and
- wherein the receiving, from the terminal device, applet running data obtained by performing a data acquisition according to the test indication information comprises:
- receiving second applet running data through the data interface of the task scheduling service, wherein the second applet running data is obtained by the terminal device in the terminal device cluster by performing a running data acquisition on each specified applet according to the task content for the specified applet, and transmitted to the second data upload address by the terminal device in the terminal device cluster.

9. The method of testing the performance of claim 8, wherein the task content comprises one or more of an applet identification information of each specified applet, an applet resource path for the specified applet, and a page query information for the specified applet, and the page query information indicates an applet page to be tested.

10. An electronic device, comprising:
- one or more processors;
- a memory having one or more programs stored thereon, wherein the one or more programs, when executed by the one or more processors, cause the one or more processors to implement the method of testing the performance of claim 1; and one or more I/O interfaces connected between the processor and the memory and configured to achieve an information interaction between the processor and the memory.

11. A non-transitory computer-readable medium having a computer program stored thereon, wherein the program, when executed by a processor, is allowed to implement the method of testing the performance of claim 1.

12. A method of testing a performance, the method comprising:

transmitting an authority acquisition request received from a terminal device to a specified developer platform server, wherein the authority acquisition request is configured to request the developer platform server to verify a user validity of a specified login user;

receiving a first test indication information from the developer platform server, wherein the first test indication information is transmitted by the developer platform server in response to verifying that the login user is a valid user; and displaying a scanning identification code for the first test indication information, so that the terminal device acquires the first test indication information by scanning the scanning identification code, wherein the first test indication information is configured to start an applet running data acquisition in the terminal device and indicate a data upload address for acquired first applet running data, the first applet running data is first applet running data carrying a token information, and the first applet running data is used for an applet performance analysis in the developer platform server to obtain corresponding applet performance data, wherein the first test indication information comprises one or more selected from: a first applet invoking protocol, a performance test switch state, a first data upload address, or an access token information, wherein the first applet invoking protocol is configured to enable the terminal device to read the first test indication information in a form of the scanning identification code, wherein the performance test switch state is configured to, in response to being set to an ON state, start an acquisition of the first applet running data in the terminal device, wherein the first data upload address indicates a data upload address through which the terminal device transmits the first applet running data to the developer platform server, and wherein the access token information is generated by the developer platform server in response to successfully verifying a validity of the user authority information of the terminal device, and the access token information is configured to verify the token information carried in the first applet running data according to an access token information, so as to verify a validity of the first applet running data, and in response to verifying that the first applet running data is valid, first applet performance data is obtained based on a performance analysis according to the first applet running data.

13. The method of testing the performance of claim 12, wherein the first applet running data is running data of a target applet, and the target applet is an applet opened and run by the terminal device after the first test indication information is acquired; and wherein the method of testing the performance further comprises: after displaying the scanning identification code for the first test indication information, receiving a first applet performance report from the developer platform server, wherein the first applet performance report is obtained after the developer platform server performs a performance analysis and a rendering processing on the received first applet running data; and displaying the first applet performance report to the terminal device.

14. An electronic device, comprising:

one or more processors;

a memory having one or more programs stored thereon, wherein the one or more programs, when executed by the one or more processors, cause the one or more processors to implement the method of testing the performance of claim 12; and one or more I/O interfaces connected between the processor and the memory and configured to achieve an information interaction between the processor and the memory.

15. A non-transitory computer-readable medium having a computer program stored thereon, wherein the program, when executed by a processor, is allowed to implement the method of testing the performance of claim 12.

16. A method of testing a performance, the method comprising:

generating a second test indication information according to a performance test task received from a developer platform server, wherein the second test indication information indicates a data upload address for second applet running data, and the second applet running data is obtained by performing a running data acquisition according to the performance test task;

transmitting the performance test task and the second test indication information to a terminal device in a predetermined terminal device cluster through a task scheduling;

receiving the second applet running data from the terminal device in the terminal device cluster; and transmitting the second applet running data to the developer platform server, wherein the second applet running data is used for an applet performance analysis in the developer platform server to obtain corresponding applet performance data, wherein the developer platform server is further configured to verify a token information carried in a first applet running data according to an access token information; and perform a performance analysis according to the first applet running data in response to verifying that the first applet running data is valid, so as to obtain corresponding applet performance data, wherein the access token information is generated in response to a validity of a user authority information of the terminal device being successfully verified by the developer platform server, and wherein the first applet running data is obtained by a data collection according to a received first test indication information by the terminal device, and the first test indication information is configured to start an applet running data acquisition in the terminal device and indicate a data upload address for transmitting the acquired first applet running data to the developer platform server.

17. The method of testing the performance of claim 16, wherein the performance test task comprises a task content for at least one specified applet, the task content comprises one or more of an applet identification information of each specified applet, an applet resource path for the specified applet, and a page query information for the specified applet, and the page query information indicates an applet page to be tested; and the second test indication information comprises a second applet invoking protocol and a second data upload address; the second applet invoking protocol is configured to enable the terminal device in the terminal device cluster to acquire the task content; and the second data upload address indicates a data upload address for the second applet running data.

18. An electronic device, comprising:
one or more processors;
a memory having one or more programs stored thereon, wherein the one or more programs, when executed by the one or more processors, cause the one or more processors to implement the method of testing the performance of claim 16; and
one or more I/O interfaces connected between the processor and the memory and configured to achieve an information interaction between the processor and the memory.

19. A non-transitory computer-readable medium having a computer program stored thereon, wherein the program, when executed by a processor, is allowed to implement the method of testing the performance of claim 16.

* * * * *